Aug. 18, 1931.  A. HOLZ  1,819,464
METHOD OF PRODUCING FERTILIZERS
Filed Sept. 2, 1927
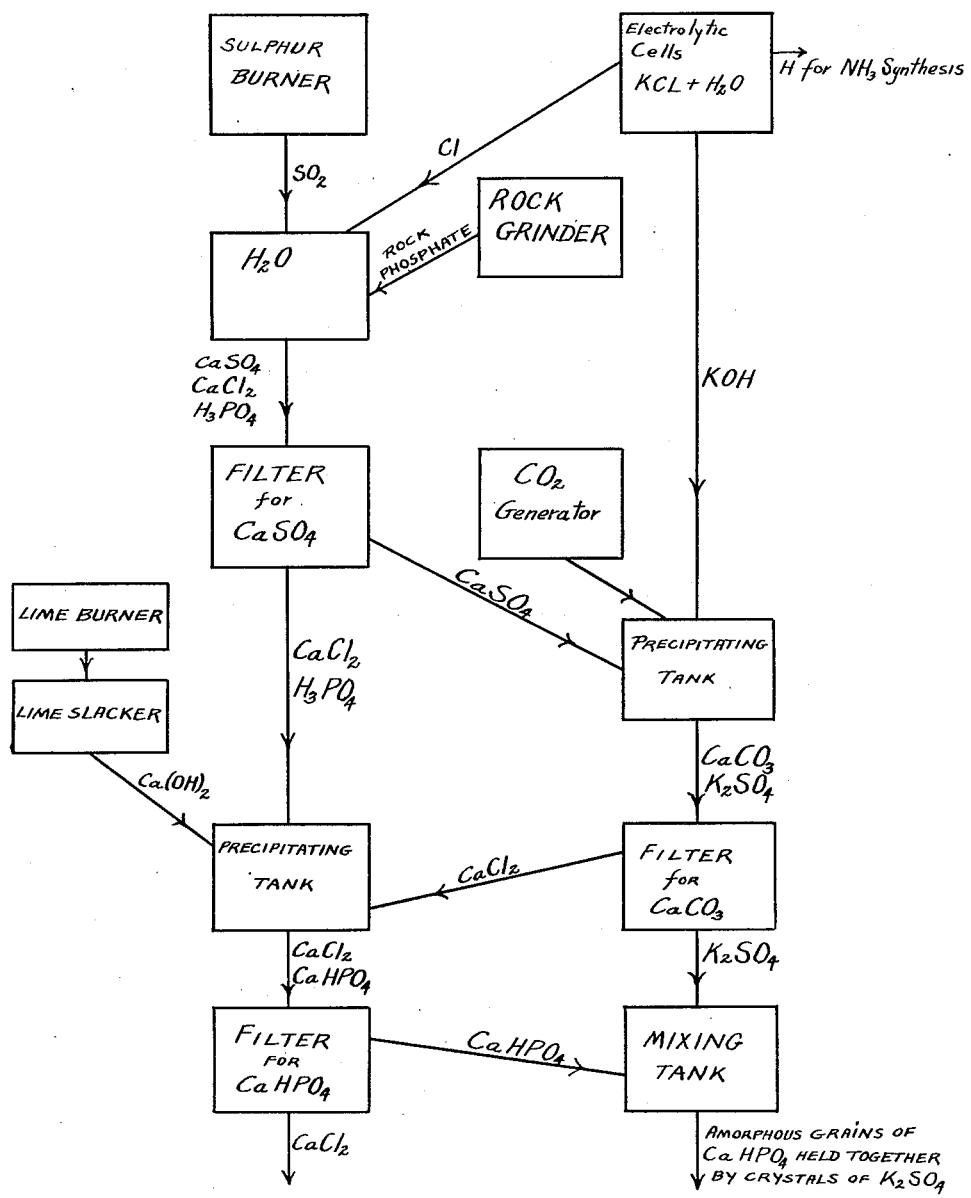
INVENTOR
August Holz
BY
Fredk C. Fischer
ATTORNEY Patented Aug. 18, 1931

1,819,464

UNITED STATES PATENT OFFICE

AUGUST HOLZ, OF IRVINGTON, NEW JERSEY, ASSIGNOR TO THEODORE V. D. BERDELL, OF NEW YORK, N. Y.

METHOD OF PRODUCING FERTILIZERS

Application filed September 2, 1927. Serial No. 217,301.

My invention relates to a novel process for producing a fertilizer containing the more essential elements (preferably five) necessary for plant growth, the fertilizer being in such concentration that handling and transportation charges are reduced to a minimum. I am well aware that there are a number of concentrated fertilizers on the market but they all differ from mine in that they have entirely eliminated the important element calcium. The value of calcium salts in nutrition is well known, and its value in this respect has but recently again been emphasized by competent investigators. The presence of calcium in a fertilizer is therefore, of prime importance, and chemical analysis of the ignition residue of the more important plants invariably shows a high percentage of calcium. The modern tendency to eliminate calcium from fertilizers is, therefore, too radical a departure from well established principles and, moreover, is most uneconomical; for this elimination can only be accomplished by a rather expensive process. In my improved process, however, concentration of the essential elements is accomplished without sacrificing this important element, calcium being retained in the form of dicalcium phosphate. Dicalcium phosphate is a neutral non-hygroscopic compound with about 42% of available $P_2O_5$, while the present acid phosphate of commerce contains not more than 16% available $P_2O_5$ and, moreover is hygroscopic and strongly acid.

Another object of my invention is the economical conversion of potassium chloride into potassium sulphate, a very desirable constituent included in my improved fertilizer, since it contains, instead of the deleterious chlorine radical, the valuable element sulphur which is of prime importance in the composition of many proteins.

In order that my invention may be more clearly understood and distinguished from the prior art, my improved process will be described in such terms that it can be carried out by any one familiar with the art. In practicing my process as illustrated by the accompanying flowsheet, I decompose, electrolytically, a solution containing 6 molecules of potassium chloride, thereby liberating 6 molecules of chlorine at the anode and 6 molecules of hydrogen at the cathode, with the simultaneous formation of 6 molecules of potassium hydroxide at the cathode. The gases, chlorine and hydrogen, are collected separately. The hydrogen, being of great purity, is immediately available for the synthetic production of ammonia, which process forms no part of the present invention. The 6 molecules of chlorine, however, may be utilized in my process and are passed into water into which 3 molecules of sulphur dioxide are simultaneously introduced, resulting in the formation of 3 molecules sulphuric and 6 molecules by hydrochloric acid, according to the equation:

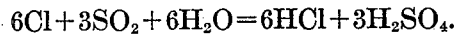
$$6Cl + 3SO_2 + 6H_2O = 6HCl + 3H_2SO_4.$$

This solution of $6HCl$ and $3H_2SO_4$ is now allowed to act upon 2 molecules of tricalcium phosphate, resulting in the decomposition of this mineral according to the equation:

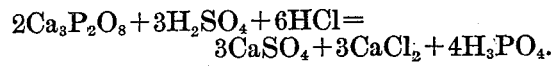
$$2Ca_3P_2O_8 + 3H_2SO_4 + 6HCl = 3CaSO_4 + 3CaCl_2 + 4H_3PO_4.$$

It is understood that pure tri-calcium phosphate does not occur in nature in commercial quantities and that therefore allowance must be made in practice for the impurities occurring in the natural rock phosphate. The above equation for the solution of calcium phosphate in a mixture of sulphuric and hydrochloric acid must therefore be modified for natural rock phosphate, to accomplish the desired effect, but this in no way changes the spirit of my invention.

The insoluble calcium sulphate, in the preceding equation, is now removed by filtration and washed with water. It is then placed in a suitable vessel or digestor, where it is preferably subjected to heat and pressure, and the solution containing the 6 molecules of potassium hydroxide is added; and carbon dioxide is passed into the solution. Potassium carbonate may be used in place of the potassium hydroxide, the latter, however, being preferred in that it is obtained electrolytically in my process. Under these circumstances the precipitated calcium sulphate will be converted into the insoluble calcium carbonate and the potassium hydroxide into potassium sulphate according to the following equation:—

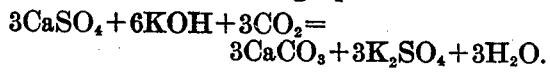
$$3CaSO_4 + 6KOH + 3CO_2 = 3CaCO_3 + 3K_2SO_4 + 3H_2O.$$

The insoluble calcium carbonate, produced according to this last equation, is removed by filtration and the solution of potassium sulphate concentrated for a further treatment as explained below.

To the mother liquor from which the calcium sulphate was removed, now containing 3 molecules of calcium chloride and 4 molecules of phosphoric acid, are now added the 3 molecules of calcium carbonate, produced from the calcium sulphate as explained above, and represented in the last preceding equation together with one additional molecule of calcium hydroxide, which will result in the formation of 4 molecules of insoluble di-calcium phosphate, as shown by the equation:—

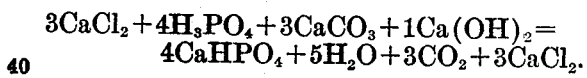
$$3CaCl_2 + 4H_3PO_4 + 3CaCO_3 + 1Ca(OH)_2 = 4CaHPO_4 + 5H_2O + 3CO_2 + 3CaCl_2.$$

The insoluble di-calcium phosphate, produced according to the last equation, is now removed by filtration and, by washing with water any adhering mother liquor of calcium chloride is forcibly removed. The di-calcium phosphate, thus obtained, when dried forms a very fine light powder. To improve its physical character and produce my improved fertilizer, I preferably add the still moist di-calcium phosphate to the concentrated solution of potassium sulphate, previously referred to, and while constantly stirring, pass a current of warm air through and over the mixture until the proper consistency (like thick cream) is reached. The mixture is then sprayed through a multiplicity of nozzles into a chamber where a current of warm air removes the last traces of moisture. In this manner I obtain a granular product, consisting of amorphous grains of di-calcium phosphate held together by crystals of potassium sulphate. The proportions of potassium sulphate and di-calcium phosphate may of course be varied within certain limits and I do not confine myself to the proportions in which these compounds are obtained in my process as herein described.

The resulting mixture of granular di-calcium phosphate and potassium sulphate, contains four of the five important elements essential for normal plant growth, namely, calcium, phosphorous, potassium and sulphur, and in such combinations as make them readily available for plant assimilation. Even the fifth element, nitrogen, may be introduced into my improved fertilizer by utilizing the hydrogen, liberated during the electrolysis of the potassium chloride, for the production of synthetic ammonia by any of the well known modern processes. As the hydrogen necessary for this purpose must be of the highest purity to avoid deterioration of the catalyst the hydrogen liberated at the cathode during electrolysis is eminently suitable for the synthesis of ammonia. Using the electrolytically derived hydrogen for this purpose, it is preferable that half of the ammonia so formed should be oxidized to nitric acid, which is then combined with the remaining ammonia to form ammonium nitrate, the most effective nitrogen compound known for plant assimilation.

I claim:

1. The process which comprises electrolytically decomposing potassium chloride in solution to form chlorine, hydrogen and potassium hydroxide, passing the chlorine into water, simultaneously with sufficient sulphur dioxide to form sulphuric and hydrochloric acids, adding to the mixed sulphuric and hydrochloric acids, calcium phosphate, thereby forming substantially insoluble calcium sulphate and soluble phosphoric acid, separating the insoluble calcium sulphate from the soluble phosphoric acid, treating the insoluble calcium sulphate with a solution of potassium hydroxide in the presence of carbon dioxide, under pressure and with the application of heat, so as to transform the calcium sulphate into insoluble calcium carbonate and the potassium hydroxide into potassium sulphate, then separating the insoluble calcium carbonate from the mother liquor.

2. The process which comprises electrolytically decomposing potassium chloride in solution to form chlorine, hydrogen and potassium hydroxide, passing the chlorine into water, simultaneously with sulphur dioxide to form sulphuric and hydrochloric acids, adding to this mixture of acids, calcium phosphate, thereby forming substantially insoluble calcium sulphate and soluble phosphoric acid, separating the insoluble calcium sulphate from the soluble phosphoric acid, treating the calcium sulphate with a solution of potassium hydroxide, in the presence of carbon dioxide, under pressure and with the application of heat, to transform the calcium sulphate into insoluble calcium carbonate and the potassium hydroxide into potassium sulphate, separating the insoluble calcium carbonate and adding it to the solution of phosphoric acid, together with a predetermined amount of calcium hydroxide, so as to produce insoluble di-calcium phosphate, then separating the insoluble di-calcium phosphate from the mother liquor.

This specification signed and witnessed this 31st day of August, 1927.

AUGUST HOLZ.